Jan. 7, 1969    J. D. VAN BENTHUYSEN ET AL    3,421,133
MOUNTING BRACKET FOR ELECTRICAL COMPONENT
Filed March 2, 1967
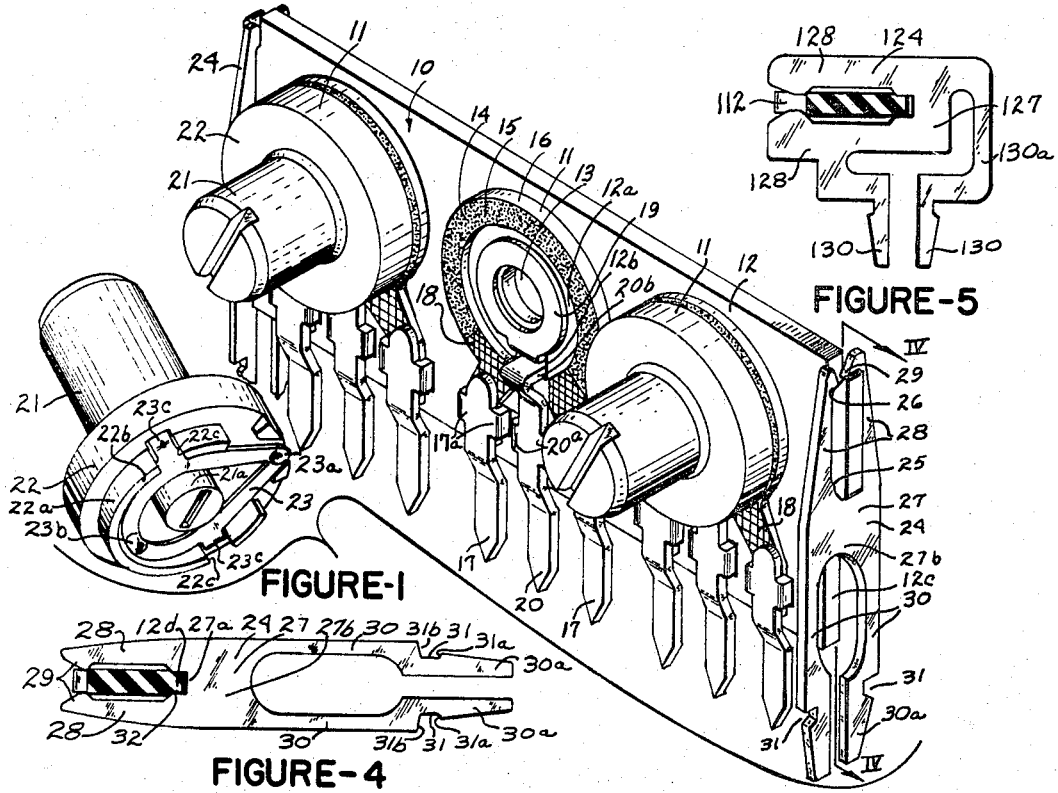
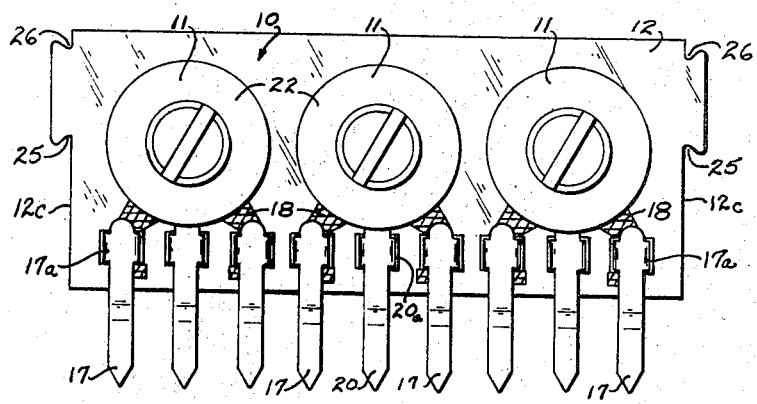
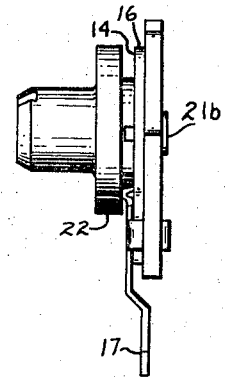
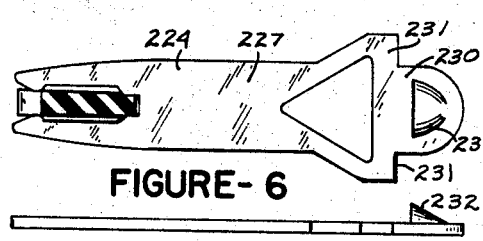
INVENTORS
JOHN D. VAN BENTHUYSEN
JACK A. ENGLISH
BY John J. Gaydos
ATTORNEY United States Patent Office 3,421,133
Patented Jan. 7, 1969

3,421,133
MOUNTING BRACKET FOR ELECTRICAL
COMPONENT
John D. van Benthuysen and Jack A. English, Elkhart,
Ind., assignors to CTS Corporation, Elkhart, Ind., a
corporation of Indiana
Filed Mar. 2, 1967, Ser. No. 620,186
U.S. Cl. 338—174                                    9 Claims
Int. Cl. H01c 5/02; H01c 1/02; H02b 1/04

ABSTRACT OF THE DISCLOSURE

A metal mounting bracket having a pair of spaced resilient arms grippingly engaging a flat electrically insulated base of an electrical component and interlocking the mounting bracket normal to the base. A panel-engaging means depending from the mounting bracket secures the component to a panel.

---

The present invention relates to a mounting bracket and, more particularly, to a mounting bracket for an electrical component such as a variable resistance control or switch of the rotatable or slideable type.

Panel-mounting brackets are generally employed for mounting low-cost electrical components, e.g., variable resistance controls, in electrical apparatus such as television receivers. These low-cost controls are usually preset by a television manufacturer after the set has been assembled and seldom need adjustment unless the set is being repaired by a serviceman. In some television receivers, the controls are located where only a serviceman can adjust them while other controls are adjustable externally of the receiver for controlling, e.g., contrast, vertical and horizontal synchronization, and the like. Although various types of mounting brackets are currently available, a fastening operation is necessary to secure the bracket to the control, for example, tabs are folded over, deformed, or staked to secure the mounting bracket to the control. It would, therefore, be desirable to provide a mounting bracket that can be rigidly secured to an insulating base of an electrical component by interlocking the bracket to the base without the need of an additional fastening operation.

Accordingly, it is an object of the present invention to provide an electrical component with a substantially flat mounting bracket receivable in a pair of spaced notches provided in the base of the electrical component. Another object of the present invention is to provide a mounting bracket with a pair of spaced resilient arms grippingly engaging a base of an electrical component. An additional object of the present invention is to provide a mounting bracket with a pair of resilient arms integral with a bridging member disposed in a notch provided in the base of an electrical component, the arms extending into another notch in the base interlocking the bracket to the base. A further object of the present invention is to provide a mounting bracket having a pair of arms securable to an insulating base of an electrical component wherein the resiliency of the arms is independent of the mounting means. A still further object of the present invention is to provide a mounting bracket fixedly securing an electrical component to a panel by the inherent resiliency of the material forming the mounting bracket and without need for additional fastening means at either the component or at the panel. Further objects and advantages of the present invention will become apparent as the following description proceeds, and the features of novelty characterizing the invention will be pointed out with particularity in the claims annexed to and forming a part of this specification.

Briefly, the invention comprises a substantially flat mounting bracket preferably of metal for securing an electrical component to a mounting panel. The mounting bracket comprises a bridging member having a portion disposed in one notch of a pair of notches provided in an electrically insulating base of the electrical component. A pair of spaced resilient arms integral with the bridging member span the distance between the notches from opposite sides of the base. Gripping portions secured to the arms and partially received in the other notch grippingly engage and interlock the base to the bracket. In a preferred embodiment, a pair of spaced legs depends from the bridging member for securing the bracket to the panel. Each of the legs is provided with an outwardly facing notch having a width substantially equal to the thickness of the panel for engaging the edges of the panel.

For a better understanding of the present invention, reference may be had to the accompanying drawings wherein the same reference numerals have been applied to like parts and wherein: FIGURE 1 is an isometric view of an electrical component having a pair of panel-mounting brackets secured to the base of the component for mounting the component to a panel; FIGURE 2 is a plan view of the electrical component shown in FIGURE 1 without the brackets; FIGURE 3 is a side view of the electrical component shown in FIGURE 2; FIGURE 4 is a plan view of the mounting bracket shown in FIGURE 1 for mounting the electrical component to a panel; FIGURE 5 is a plan view of a modified form of mounting bracket for securing the base of an electrical component parallel to a mounting panel; FIGURE 6 is a top plan view of another modified form of mounting bracket; and FIGURE 7 is a side view of the bracket shown in FIGURE 6.

Referring now to FIGURES 1–3 of the drawings, there is illustrated an electrical component of the type employed in electrical apparatus such as television receivers, generally indicated at 10, comprising three variable resistance controls 11 carried by a dielectric base 12 of suitable electrically nonconductive material such as laminated plastic or alumina. Various types of variable resistance controls 11 or switches can be carried by the common base 12 by providing suitable mounting means such as a round opening 13 in the base. Means 14 defining a resistance path, i.e., a resistance element, is secured to the base 12 concentric to the opening 13 and comprises a carbon film 15 deposited on an arcuate strip 16 of insulating material such as laminated plastic or alumina fixedly secured to the base in a suitable manner such as with terminal lugs 17a. Thin metallized or cermet film can also be used. Conductive paths 18 in overlapping relationship with the ends of the carbon film connect the resistance element 14 to the end terminals 17. The carbon film can obviously be deposited directly onto the surface of the base 12. A flat ring collector 19 integral with a center terminal 20 fixedly secured to the base by a pair of terminal lugs 20a is concentric with the round opening 13 and the resistance element. A rotatable shaft 21 having a reduced portion 21a is suitably secured in the round opening 13 by deforming the end portion 21b (see FIGURE 3). A driver 22 molded to the shaft carries a contactor 23 having a pair of contacts 23a and 23b wipingly engaging the resistance element 14 and the collector 19 respectively as the shaft is rotated. More specifically, a peripheral skirt 22a integral with the driver 22 and concentric to the shaft 21 has a bearing surface 22b slidably engaging the annular track 12a of the base 12 between the resistance element 14 and the collector 19. Recesses 22c provided in the skirt 22a receive radially extending arms 23c integral with the contactor 23 and constrain the contactor to rotate with the driver. To avoid interference between the peripheral skirt 22a and the center terminal 20, the base 12 is provided with a cut out portion 12b (see FIGURE 1) and a U-shaped portion 20b of the terminal 20 is disposed in the cut out portion providing an uninterrupted track 12a. The variable resistance controls 11 can be of the rotatable type as shown in the drawing having a shaft or of not-shown rectilinear type where the resistance element and the collector lie in a straight line and a contactor is moved rectilinearly intermediate the ends thereof.

For the purpose of securing the electrical component 10 to a not-shown panel, a pair of flat mounting brackets 24, preferably of metal or a suitable plastic are received in lower and upper notches 25 and 26, one pair of notches being provided on opposite ends of the base 12. Obviously the upper notch could be part of the opening, hole, indentation on each side of the base or the like. Each of the mounting brackets comprises a bridging member 27 having a portion 27a (see FIGURE 4) disposed in the notch 25 and preferably a side 27b abutting against the edge 12d of the base 12 (see FIGURE 1). A pair of arms 28 integral with the bridging member 27 span the distance between the notches 25 and 26 from opposite sides of the base 12. Gripping portions 29 connected to the ends of the arms 28 are in registry with the notch 26 and, since the distance between the gripping portions 29 is less than the thickness of the base, the gripping portions extend partially into the notch 26 engaging the base (see FIGURE 4) and interlocking the mounting bracket to the base 12. It is, therefore, preferable that the mounting bracket be of a resilient metal, otherwise the arms will not spring back into the notch 26 after being spread apart by the base 12 during assembly of the mounting brackets to the base 12.

In a preferred form of the invention, a pair of legs 30 extending downwardly from the bridging member 27 and insertable into an opening, e.g., a rectangular slot, provided with an outwardly facing notch 31 having a front or outside width slightly greater than the thickness of the panel to facilitate mounting of the bracket 24 to the panel. The tapered end 30a of each of the legs and one side 31a of the associated notch defines a hook, the hooks in each pair of legs being disposed in edgewise spaced relationship and substantially perpendicular to the base. The disposition of the legs enables the legs to be biased toward each other facilitating insertion of the legs into the slot provided in the panel. The other side 31b of each of the notches 31 extends outwardly slightly farther than the one side 31a to limit insertion of the legs 30 into the slots provided in the panel. The slot in the panel preferably is of a length less than the distance between the notches 31 to assure that the mounting bracket 24 is rigidly supported in the panel. Preferably one or both sides 31a and 31b of each of the notches 31 are tapered to assure that the edges of the panel defining the slots always are wedged in the notches regardless of a slight change in thickness of the panel. By making the width of the legs from the bridging member 27 to the notches 31 substantially equal, the desired resiliency in the legs is obtained. In a preferred form of the invention, the minimum width of the bridging member 27, i.e., the distance between the arms and the legs is substantially greater than the width of one of the legs to assure that the resiliency of the arms 28 is independent of the mounting means, that is, the legs. Substantially greater is at least 30 percent, preferably 50 percent greater.

Preferably to assure that the mounting bracket 24 is rigidly secured to a base 12, a recess 32 having a width slightly less than the thickness of the base is provided in the bridging member. Upon assembly of the mounting bracket 27 to the base 12, the portion 12d of the base adjacent to the notch 25 is wedged into the recess 32 provided in the bridging member interlocking the bracket to the base (see FIGURE 4). Longitudinal and rotational movement of the mounting bracket with respect to the base is eliminated since the portion 12d of the base adjacent to the notch 25 is comprised in the recess 32 forming an interference fit between the base and the bridging member 27 of the mounting bracket while the portion of the base adjacent to the upper notch 26 is compressed by the gripping portions 29 connected to the arms.

In an electrical component built in accord with the present invention, the base 12 had a thickness of .050 inch, the width of the recess 32 was .047 inch thereby providing an interference fit of .003 inch. The distance between the gripping portions was .030 inch causing the portion of the base adjacent to the top notch 26 to be compressed but somewhat less than .020 inch since the arms are spreadable outwardly.

The mounting bracket 124 shown in FIGURE 5 is similar to the bracket 24 except that the legs 130 form a 90° angle with the arms. Preferably the width of the upper portion 130a of one leg is substantially less than the width of the bridging member 127 to assure that the arms 128 do not spread apart sufficiently to weaken the grip between the arms and the base 112 when the legs 130 are inserted into a slot provided in the not-shown mounting panel.

In a modified form of the invention as shown in FIGURES 6 and 7, the upper portion of the mounting bracket 224 is identical to the bracket 24. The panel-securing portion is, however, different in that a leg 230 depends from a bridging member 227 and a pair of stop members 231 extending laterally from the leg 230 abut against the top surface of a not-shown panel. A barb 232 formed from the lower portion of the leg 230 and lying out of the plane of the upper portion of the bracket engages the other surface of the panel securing the bracket to the panel.

It is, therefore, apparent that flat metal mounting brackets can be readily secured to the base of electrical components by quickly forcing the gripping portions of the arms to pass over and span the portion of the base between the lower and upper notches simultaneously forcing the bridging member of the bracket to engage the portion of the base adjacent to the lower notch firmly interlocking the mounting bracket to the base. An electrical component with a mounting bracket rigidly secured to opposite ends of the base can readily be mounted to a mounting panel of a television receiver or the like.

While there has been illustrated and described what is at present considered to be a preferred embodiment of the present invention, and additional modifications thereof, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A variable resistance control comprising a base of electrically nonconductive material provided with two pairs of spaced notches at opposite ends of the base, means defining a resistance path on a side of the base, collector means secured to the base and spaced from the first mentioned means, a contractor adapted to wipe both of the means, and a mounting bracket secured to each pair of spaced notches in the base, said mounting bracket comprising a bridging member, a portion of the bridging member being disposed in one of the notches, a pair of spaced resilient arms integral with the bridging member and lying in the same plane as the bridging member, said arms lying in a plane normal to the base and on opposite sides of the base, said arms spanning the distance between the notches, a gripping portion secured to each of the arms, the gripping portions being in registry with the other notch and facing each other, the distance between the gripping portions being less than the thickness of the base for interlocking the bracket to the base to prevent movement of the bracket edgewise of the base, and panel-engaging means integral with the bridging member for securing the mounting bracket and the base to a panel.

2. The control of claim 1, wherein the panel-engaging means comprises a pair of spaced resilient legs lying in a plane normal to the base, each of the legs being provided with an outwardly facing panel-engaging notch.

3. The control of claim 1, wherein the portion of the bridging member disposed in the one notch is provided with a recess, the width of the recess being less than the thickness of the base, a portion of the base between the notches being wedged in the recess rigidly securing and interlocking the bracket to the base to prevent movement of the bracket normal to the base.

4. The variable resistance control of claim 1 wherein the base is provided with an opening, the means defining the resistance path is arcuate and is spaced around the opening, the collector means is secured to the base in the bight of the arcuate resistance path and spaced therefrom, the collector being provided with a hole axially aligned with the opening, an annular track provided on the base between the resistance path and the collector means, said track being provided with a cut-out portion, a center terminal, a U-shaped terminal portion disposed in the cut-out portion with one leg of the terminal portion connected to the terminal and the other leg connected to the collector means thereby providing an uninterrupted path on the track, a shaft passing through the hole and journaled in the opening, a driver connected to the shaft, the contactor adapted to wipe the resistance path and the collector means being constrained to rotate with the driver, and an annular skirt integral with the driver slideable on the annular track.

5. The control of claim 1, wherein the length of the arms between the bridging member and the gripping portions is less than the distance between the spaced notches provided in the base.

6. A mounting bracket for securing an electrical component having a dielectric base to a mounting panel, the base having a front side and a rear side and a pair of spaced notches, said mounting bracket comprising a bridging member at least partially disposed in one of the notches, a pair of spaced resilient arms integral with the bridging member and lying in the same plane as the bridging member, said arms extending from the bridging member toward the other notch from the front and rear sides of the base, a gripping portion secured to each of the arms and at least in partial registry with the other notch, the distance between the gripping portions being less than the thickness of the base for interlocking the bracket to the base to prevent movement of the bracket edgewise of the base, and panel-engaging means integral with the bridging member for securing the mounting bracket and the base of the electrical component to a panel.

7. The mounting bracket of claim 6, wherein the panel-engaging means comprises a pair of spaced resilient legs compressible toward each other upon insertion of the legs into a slot provided in the panel, each of the legs being provided with an outwardly facing notch having a width substantially equal to the thickness of the panel.

8. The mounting bracket of claim 6, wherein the portion of the bridging member disposed in the one notch is provided with a recess, the width of the recess being less than the thickness of the base, the edges of the recess being wedged into a portion of the base between the notches rigidly securing and interlocking the bracket to the base.

9. The control of claim 7, wherein the resilient legs are normal to the arms and in planor relationship, and the width of one of the legs is substantially equal for a majority of the length thereof permitting flexure of the one leg toward each other leg.

References Cited

UNITED STATES PATENTS 2,616,643 11/1952 Budd _____ 338—315
2,627,385 2/1953 Tinnerman _____ 338—315 X ROBERT K. SCHAEFER, *Primary Examiner.*

H. J. HOHAUSER, *Assistant Examiner.*

U.S. Cl. X.R.

248—47; 317—101; 338—128, 315

UNITED STATES PATENT OFFICE
CERTIFICATE OF CORRECTION

Patent No. 3,421,133            Dated January 7, 1969

Inventor(s) J. D. VAN BENTHUYSEN AND JACK A. ENGLISH

It is certified that error appears in the above-identified patent and that said Letters Patent are hereby corrected as shown below:

Column 3, line 38;    Insert after the suffix "vided" and before the word "with" ---in the not-shown panel secures the mounting bracket 24 to the panel. Preferably each of the legs is provided---.

Column 6, line 27;    The word "planor" should be changed to ---planar---.

Signed and sealed this 12th day of October, 1971.

(SEAL)
Attest:

EDWARD M. FLETCHER, JR.            ROBERT GOTTSCHALK
Attesting Officer                  Acting Commissioner of Patents